Patented Feb. 14, 1933

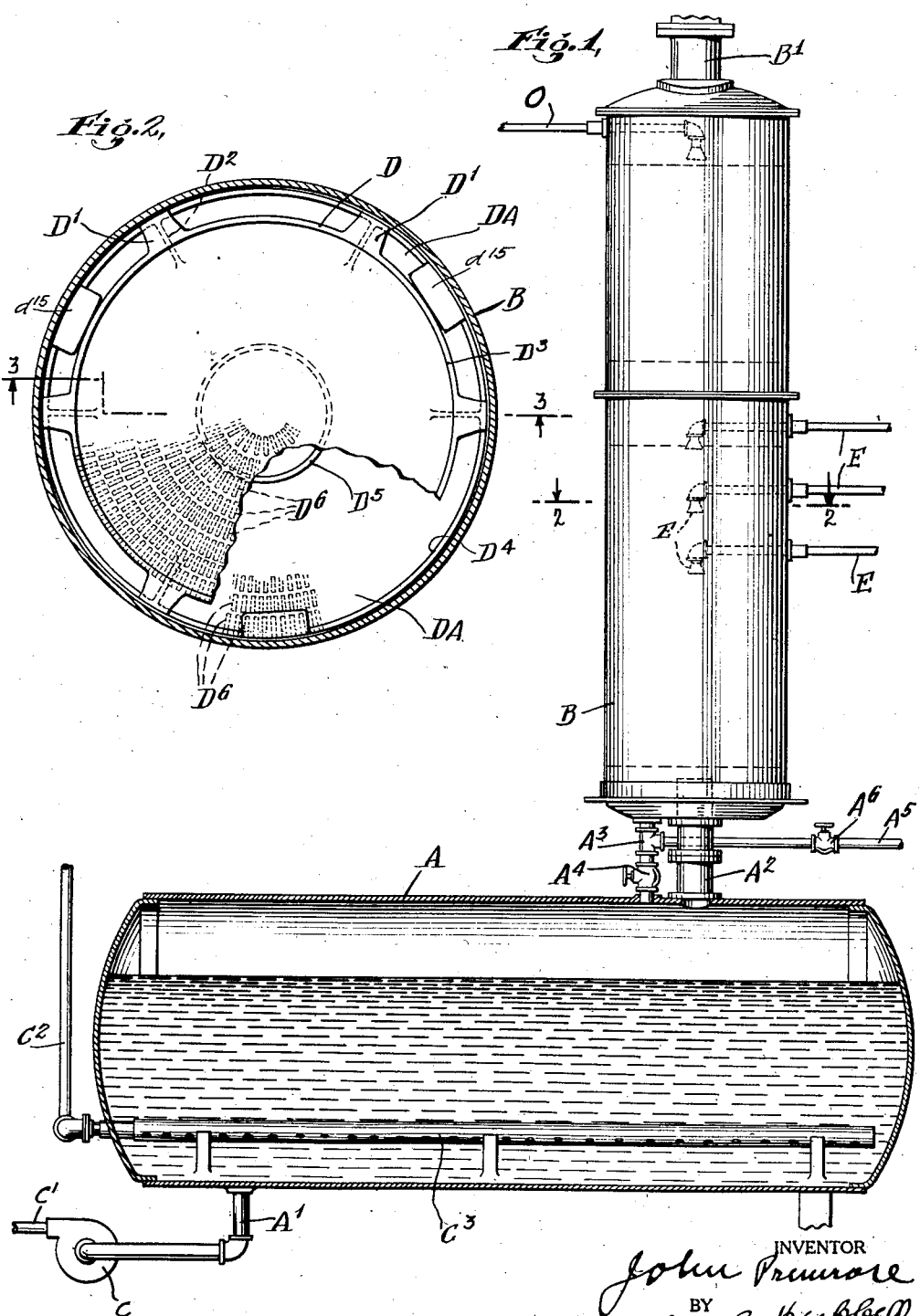

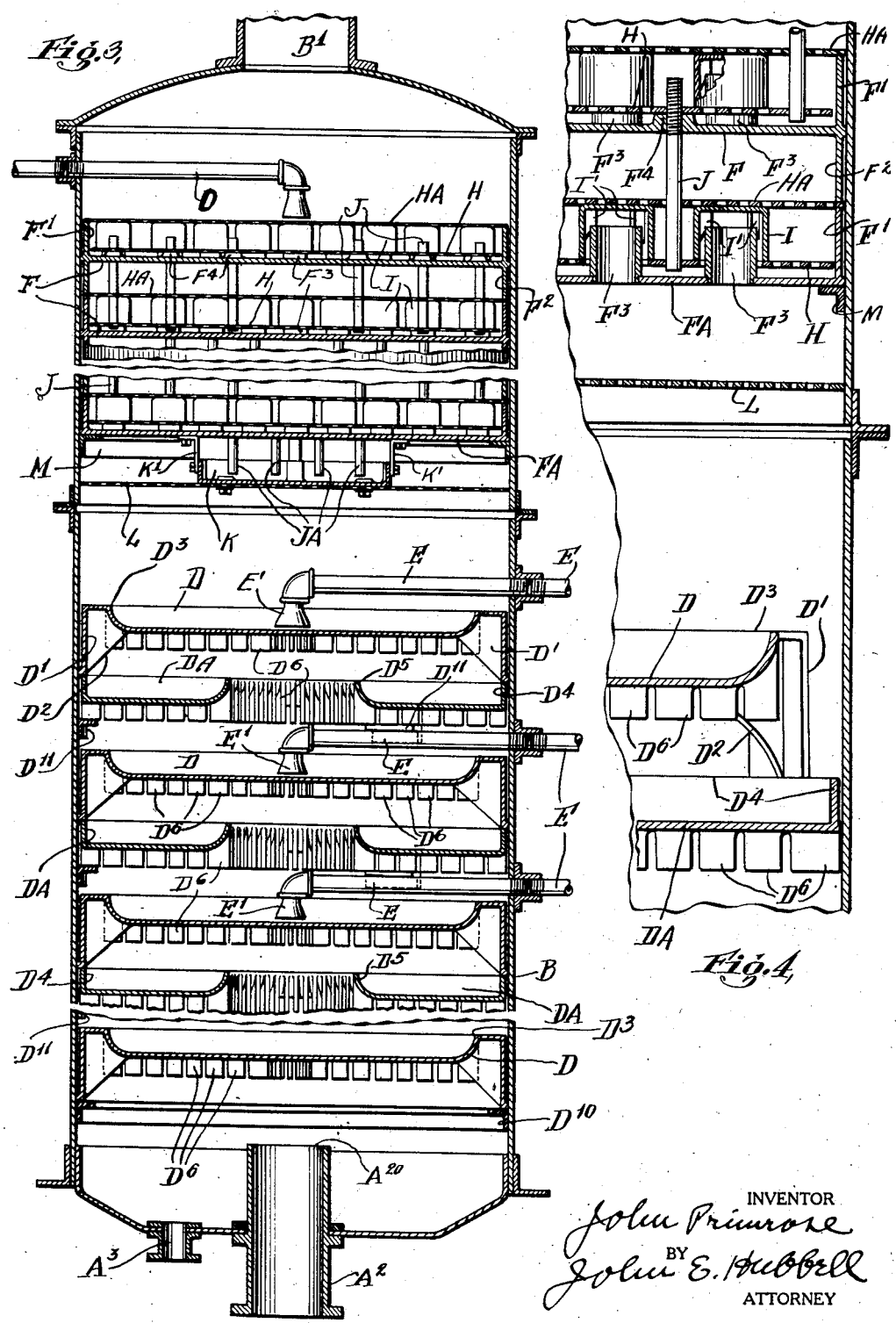

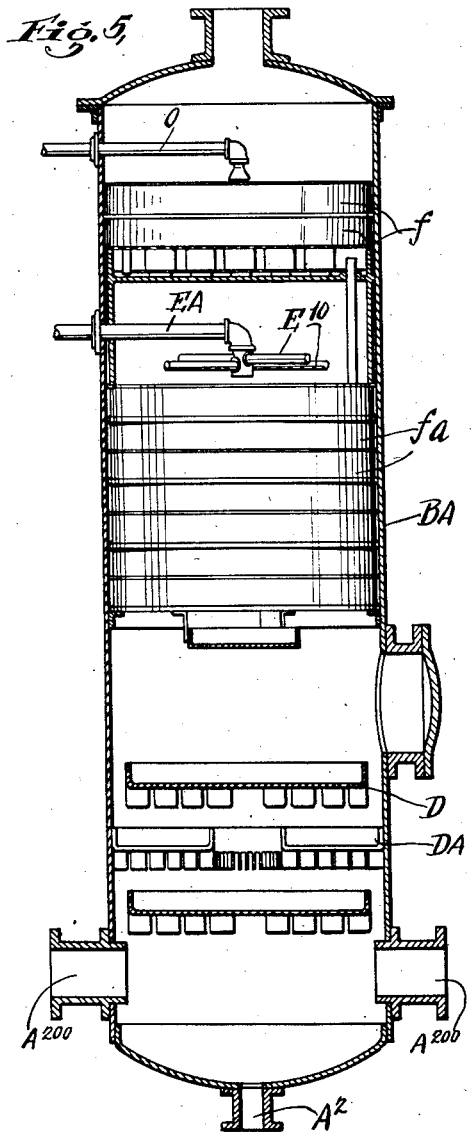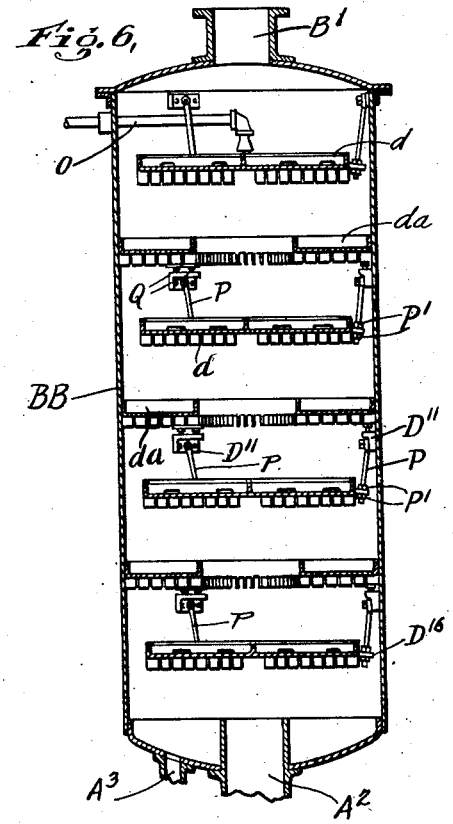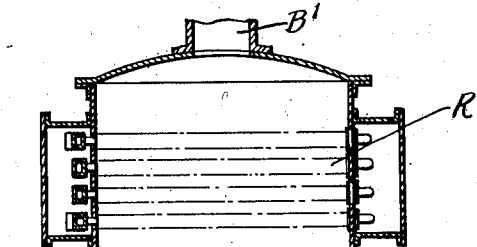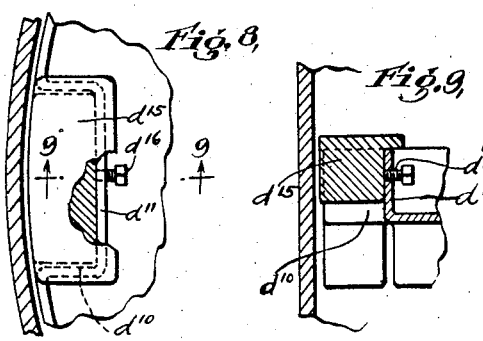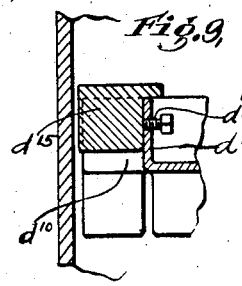

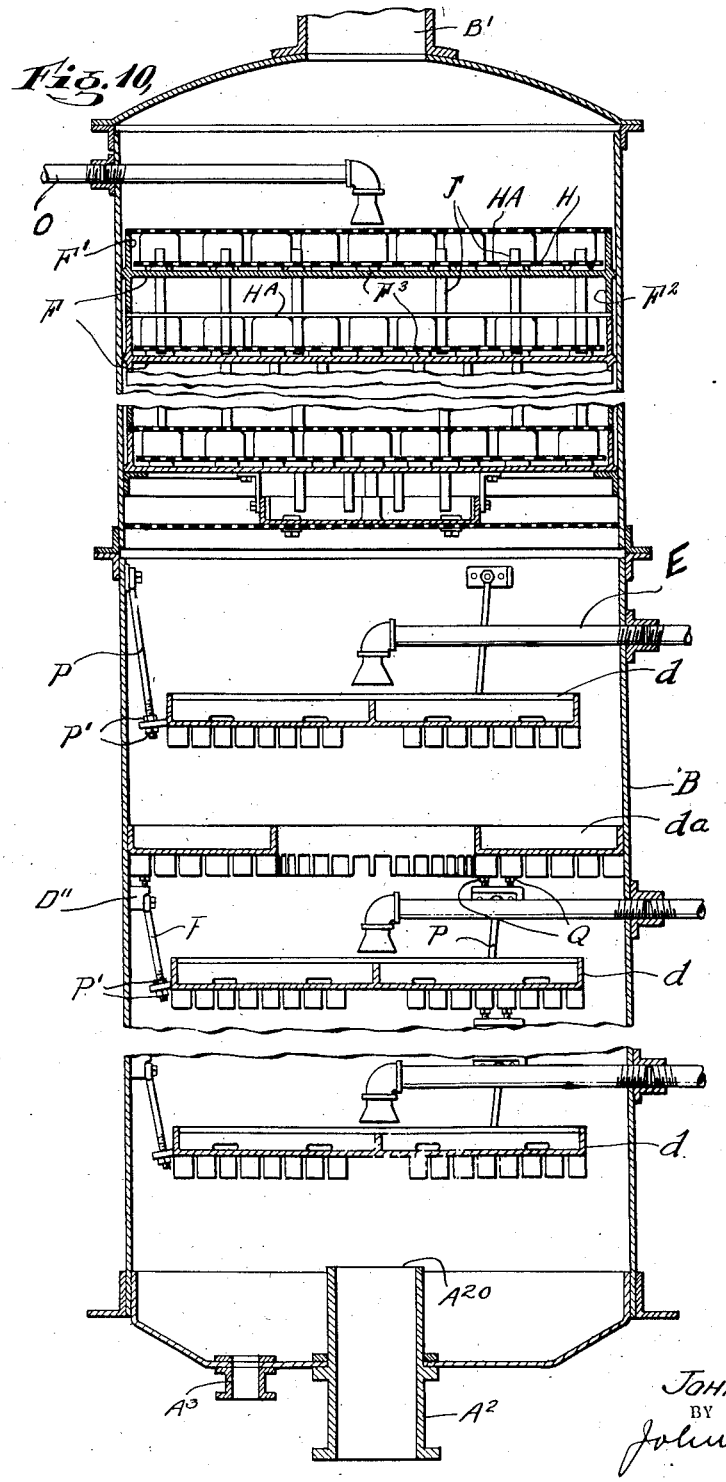

1,897,766

UNITED STATES PATENT OFFICE

JOHN PRIMROSE, OF RICHMOND, NEW YORK, ASSIGNOR TO FOSTER WHEELER CORPORATION, OF NEW YORK, N. Y., A CORPORATION OF NEW YORK

MEANS FOR SEPARATING LIQUID FROM VAPORS AND GASES

Application filed January 31, 1925. Serial No. 5,984.

My present invention consists in improved means for separating liquid from vapors and gases, and was primarily devised for use in oil refining to separate from a mixture of heated petroleum oil and the vapors and gases evolved in the heating of the oil, the gases and all of the vapors having boiling points below a predetermined temperature or temperatures. More specifically, the object of my invention is to provide an improved fractionating tower for separating liquid oil from the gases and vapors evolved in heating the oil with a condensation therein of all vaporized constituents having boiling points above a predetermined temperature. The invention comprises improvements in construction and arrangement devised with the general object in view of simplifying the construction and increasing the capacity of apparatus of the character described.

The various features of novelty which characterize my invention are pointed out with particularity in the claims annexed to and forming a part of this specification; but for a better understanding of the invention, however, its advantages and specific objects attained with its use, reference should be had to the accompanying drawings and descriptive matter in which I have illustrated and described preferred embodiments of my invention.

Of the drawings:

Fig. 1 is an elevation partly in section of a portion of an oil refining unit in which the invention is employed;

Fig. 2 is a transverse section on the line 2—2 of Fig. 1;

Fig. 3 is a vertical section on the broken line 3—3 of Fig. 2;

Fig. 4 is a partial section on a larger scale than Fig. 3;

Fig. 5 is a section taken similarly to Fig. 3 of a modified form of separating tower;

Fig. 6 is a vertical section of another form of separating tower;

Fig. 7 is a vertical section through a fourth form of separating tower;

Fig. 8 is a plan view of a portion of one of the trays shown in Fig. 6;

Fig. 9 is a section on the line 9—9 of Fig. 8; and

Fig. 10 is a vertical section of the construction shown in Fig. 3 provided with distilling trays of the type shown in Fig. 6.

In the drawings and referring first to the construction shown in Figs. 1 to 4, I have illustrated the use of a preferred form of fractionating tower in connection with oil refining apparatus comprising a tank A from which oil is passed through an outlet A', as by means of a circulating pump C and its outlet pipe C' to a suitable oil heater (not shown) from which the heated oil is returned to the tank A through a pipe $C^2$ which advantageously terminates in a perforated discharge section $C^3$ located within the tank A well below the normal liquid level therein. Vapors and gases evolved as a result of heating the oil, and liberated from the upper surface of the body of oil in the tank A pass through the outlet $A^2$ into the lower end of the fractionating tower B.

The tower B as shown, comprises a cylindrical shell within which is located a lower set of trays D and DA which I call distilling trays, and an upper set of bubble trays F and FA, means including one or more pipes E for discharging the raw oil onto the distilling trays; and, in the preferred construction illustrated, a pipe O for discharging reflux oil onto the top of the bank of bubble trays F and FA. The oil passed into the tower B through the pipes O and E, and not vaporized in the latter, as well as condensate formed in the tower is discharged into the tank A through the bottom connection $A^3$ which is advantageously of suitable restricted flow capacity so that its upper end is normally covered by a body of liquid collecting in the lower portion of the tower and the upper level of which is limited by the height of the upper end $A^{20}$ of the vapor pipe $A^2$ which extends up into the tower to a point intermediate the bottom of the tower and the lowermost tray D.

The trays D are shaped to form shallow pans extending across the tower and each having an overflow edge or rim $D^3$ adjacent the inner wall of the shell, but separated therefrom by an annular space through which the oil overflowing from the tray D passes downward. As shown in Figs. 2 to 4, each tray D is provided with a plurality of angularly spaced apart radial extensions $D'$ which center the tray in the tower, and may be prolonged downwardly below the level of the bottom of the tray to form supporting feed engaging or resting upon the immediately subjacent tray DA, or in the case of the lowermost tray D, on a supporting rib $D^{10}$ secured to the inner wall of the tower shell. The oil overflowing the discharge lip $D^3$ of the lowermost tray D passes directly into the pool of oil in the bottom of the tower but the oil overflowing the lip $D^3$ of each upper tray D is received in the immediately subjacent tray DA. Each tray DA is in the form of a shallow pan, the peripheral rim $D^4$ of which fits against the inner wall of the tower shell. Each tray DA is formed with a central opening surrounded by an uprising flange or rim $D^5$ over which oil overflows onto the subjacent tray D. The trays DA are supported, as shown, by means of ribs $D^{11}$ secured to the inner wall of the tank B. The arc-shaped overflow spaces at the peripheries of the trays D, and the central apertures in the trays DA are of ample size to provide a free upflow path for the oil vapors which are not materially obstructed by the downflowing liquid. A novel and important characteristic of the trays D and DA consists in the provision on the undersides of the latter of a multiplicity of integral depending ribs $D^6$. Advantageously as shown, the ribs $D^6$ are in the form of vertical plates extending radially to the axis of the tower, and arranged in a plurality of spaced apart circular series as shown best in Fig. 2. The ribs $D^6$ extend into the path of the gas passing along the under side of the tray carrying the ribs and greatly increase the area of contact between the ribs and the gas, and therefore increase the rate of heat transfer from the gas to the liquid carried by the trays. The presence of these ribs substantially decreases the bulk of the apparatus required for transferring a given amount of heat in a given time from the descending oil to the uprising vapor.

As shown in Figs. 1 to 4, the oil to be treated is supplied through three pipes E, one located above the corresponding one of each of the three uppermost distilling trays D, but it will be understood that oil may thus be passed directly onto the upper side of each of the trays D or onto the side of the uppermost tray D or onto any desired number of trays D. Advantageously each pipe E terminates in a downwardly extending head $E'$. The oil vapor passing from beneath each of the trays D and DA to the space above that tray must pass through the descending film-like stream of oil overflowing the lip $D^3$ in the case of a tray D, and the lip $D^5$ in the case of a tray DA.

The bubbling still section of the tower is characterized by various novel features of construction and arrangement. As shown, each tray F is in the form of a suitably apertured disc-like body extending across the shell, and provided at its periphery with an uprising rim portion $F'$ and a depending rim portion $F^2$. In this respect the bottom tray FA is like the trays F, except that in the form shown the depending rim portion $F^2$ is omitted from the bottom tray FA, and the latter rests on a rib M carried by the tank shell. Each of the trays F and FA is formed with a plurality of suitably disposed apertures for the upflow of vapor, surrounded at the upper side of the tray by a tubular part $F^3$. Each part $F^3$ may be an integral cast metal portion of the tray to which it pertains, but as shown, is in the form of a separable tube section having its lower end seated in the tray. Each tubular part $F^3$ is capped by a bell member I, shown as a cup-shaped cast metal part formed with internal centering and spacing ribs $I'$ to provide the necessary space for the flow of vapor over the upper edge of the tubular part $F^3$, and downward through the annular space between the tubular part $F^3$ and the cylindrical body of the corresponding bell member I.

Each of the trays F and FA is provided on its upper side with a set of suitably spaced projections $F^4$ shown as integral lugs. The projections $F^4$ of each of the trays supports a perforated plate or diaphragm H which is thereby spaced above the tray body to provide a shallow intervening space. Each perforated plate H is engaged and held in place by the lower ends of the corresponding bells I. Each set of bells I are held in place by another perforated plate HA the peripheral edge of which is received between the upper edge of the subjacent tray rim $F'$, and except in the case of the uppermost plate HA is held against the latter by the lower edge of the rim $F^2$ of the tray F above.

The liquid overflows from each upper tray F in the bubbling still section onto the subjacent tray through a series of overflow pipes J shown as screwed through threaded apertures in the upper tray body, formed centrally in each projection F⁴. The upper end of each overflow pipe J terminates at a level preferably below the upper level of the adjacent tubular parts F³. The lower end of each overflow pipe J extends through the immediately subjacent perforated plates HA and H, and opens into the space between the latter and the subjacent tray body. The overflow connections J for each of the trays F are suitably distributed over the entire extent of the tray, but advantageously, as shown, the overflow connections JA for the lowermost tray FA are all disposed adjacent the central portion of the tray, and all have their lower ends submerged in the liquid received in a sealing tray or pan K appreciably smaller in diameter than the tower itself and carried by the tray FA through brackets K'. Advantageously as shown, a perforated plate L is carried by the pan K so that the oil overflowing from the latter is distributed in fine streams over the major portion of the subjacent tray D. The reflux liquid discharged onto the top of the bank of bubbling still trays may be oil having a boiling point like that of the highest constituent of the vapors which it is desired to discharge from the tower through the vapor outlet B'.

The bubbling still section just described, is characterized by its mechanical simplicity and effectiveness, and by the unusually large liquid and gas contact area provided, the area and effectiveness of the contact being due in large part to the fact that both the downcoming oil and uprising vapor are discharged into the space immediately above each of the trays F and FA, and the adjacent perforated plate H, the perforations in each plate H being preferably so proportioned and distributed as to insure an appreciable horizontal flow of the vapor through said space before all of the vapor can escape from that space upwardly through the perforations in the plate H. The perforated plates HA also increase the extent and effectiveness of the vapor and liquid contact.

By introducing the raw oil through the pipes E and spray heads E' this oil is initially atomized and is so subdivided in its flow over the distilling trays D and DA as to subject the oil to a highly efficient distilling action in the lower portion of the tower thereby vaporizing practically all portions of the raw oil which can be vaporized by a distilling action carried on at the temperature at which the hot vapors are introduced into the lower end of the tower from the heating system of which the tank A forms a part. The fact that there is a free vapor path through the distilling section, as distinguished from the multiplicity of vapor path sections separated by liquid seals in the bubbling still section, tends to a pressure and temperature equalization in the distilling section conducive to a high distilling efficiency. The capacity of the distilling section is enhanced, of course, by the very effective provisions made for providing a relatively large liquid and gas contact surface area, as well as by the extended heat absorbing surfaces of the distilling trays formed by the projections D⁶ at the underside of the trays.

The spacing apart of the distilling and bubbling still sections provides a space in which the vapor velocity is reduced which contributes to the elimination of entrained liquid from the stream of vapor passing upward into the bubbling still section. The special construction of the bubble still section possesses obvious mechanical advantages, as well as a large and effective liquid and vapor contact area, and gives large capacity per unit of space occupied. The construction, as a whole, gives a desirably large capacity per unit space occupied, while at the same time yielding a vapor end product containing practically all of the vapor constituents of the desired low boiling points contained in the hot vapors entering the inlet A², and which can be distilled out of the raw oil at the temperature and pressure maintained in the lower portion of the tower.

It will be apparent of course, that features of the invention illustrated in Figs. 1 to 4 may be employed and combined in various ways. For example, as shown in Fig. 5, the tower BA may be provided with upper and lower bubbling still sections $f$ and $fa$, each individually like the bubbling still section of Figs. 1 to 4, with provisions for passing some or all of the raw oil into the tower above the lowermost bubbling still section $fa$ as by means of the oil supply pipe EA and its perforated distributing extensions E¹⁰. With this construction, the distilling trays D and DA may well be fewer in number than in the arrangement shown in Figs. 1 to 4. The tower BA as shown is provided with two lateral vapor inlets A²⁰⁰.

In some cases distilling trays like the trays D and DA of Fig. 4 may advantageously be employed without a corresponding use of a bubbling still section, as shown in Fig. 6. In the last mentioned figure, a separating tower BB is provided with a lower vapor inlet A², and vapor and liquid outlets B' and A³, respectively, as in Figs. 1 to 4. Mounted in the tower BB are a series of trays $d$ and $da$ which may be exactly like the trays D and DA, respectively, as described. As shown in Fig. 6 however, a special form of supporting means for the distilling trays is employed, and this construction may also be employed with advantage in the construction shown in Figs.

1 to 5 as shown in Fig. 10. In Fig. 6 each tray $d$ is supported by hanger bolts P which are carried preferably through a sort of universal joint connection from the brackets $D^{11}$ secured to the inner wall of the tower shell. Each hanger bolt P passes through an apertured ear $D^6$ on the tray $d$ supported by it, and is provided with upper and lower lock nuts P' by which the portion of the tray directly engaged by the hanger bolt P may be vertically adjusted. This arrangement permits the trays $d$ to be adjusted to bring all portions of the overflow lip $D^3$ of the tray into the same horizontal plane as is desirable to insure a uniform discharge flow over all portions of the lip. Each set of lugs or brackets D' below a tray $da$ are provided with vertically adjustable bolts Q threaded into the bracket $D^{11}$ on which the tray $da$ immediately above the brackets is supported. This mode of supporting the trays $da$ permits each of the latter being adjusted to bring all portions of its overflow lip into the same horizontal plane.

With this arrangement there are preferably three hanger bolts P for each tray $d$ and the tray $da$ above it. To facilitate the adjustment of the hanger bolts P and the bolts Q, each tray $d$ is advantageously formed adjacent each supporting bracket $D^{11}$ with a notch $d^{10}$ surrounded by a marginal flange $d^{11}$ in which a notch closing device $d^{15}$ is normally secured as by a set screw $d^{16}$. By removing the closing devices $d^{15}$ the bolts P and Q are made accessible, and furthermore the trays $da$ may be moved vertically upward in the shell when the notch closing devices are removed, as the margin of the notches may then clear the brackets $D^{11}$. To facilitate the insertion and removal of trays, the trays $da$ may similarly be formed with notches normally closed by closing devices $d^{15}$ as shown in Fig. 2.

The tower BC shown in Fig. 7 differs from the construction previously described in omitting the distilling trays, and in the provision of a vapor cooler or condenser R above the bank of bubbling still trays in the tower which may serve to provide some or all of the necessary reflux liquid within the tower by its condensing effect on the oil vapors passing over it. The cooler R, as shown, comprises a bank of horizontal tubes extending across the tower between the bubbling still trays and the vapor outlet B'. Through these tubes there is passed a suitable cooling agent which may well be a portion or all of the raw oil going to the heater with which the tower is associated. Advantageously, the cooler R may be formed of a bank of closely spaced tubes encased in externally corrugated casings and generally similar in form to the well known Foster economizer employed for heating boiler feed water.

Certain novel features of construction and arrangement disclosed but not claimed herein are claimed in my prior application Serial No. 748,115, filed November 6, 1924, which has since matured as Patent No. 1,805,635, granted May 19, 1931.

While in accordance with the provisions of the statutes, I have illustrated and described the best form of my invention now known to me, it will be apparent to those skilled in the art that changes may be made in the form of the apparatus disclosed without departing from the spirit of my invention, as set forth in the appended claims and that certain features of my invention may sometimes be used to advantage without a corresponding use of other features.

Having now described my invention, what I claim as new and desire to secure by Letters Patent, is:

1. In a liquid and vapor contact tower, the combination with the tower shell of a series of super-imposed trays mounted therein, and means for supporting the trays from the shell, including provisions for adjusting the trays relative to a horizontal plane to insure the proper flow distribution over the latter.

2. In a liquid and vapor contact tower, the combination with the tower shell of a series of super-imposed trays mounted therein, and means for supporting the trays from the shell, including provisions for adjusting the trays relative to a horizontal plane to insure the proper flow distribution over the latter, said provisions comprising brackets secured to the inner wall of the shell and adjustable tray supports carried by said brackets.

3. In a liquid and vapor contact tower, the combination with the tower shell of a series of super-imposed trays mounted therein, brackets secured to the inner wall of the shell, and adjustable tray supports carried by each bracket engaging and supporting a tray above and a tray below.

4. In a liquid and vapor contact tower, the combination with the tower shell, of a series of super-imposed trays mounted therein, brackets secured to the inner wall of the shell, hanger bolts supported by said brackets and each adjustably connected to a tray below the brackets, and adjustable stud bolts mounted in the brackets and each supporting a tray above the brackets.

5. In a liquid and vapor contact tower, the combination with the tower shell, of super-imposed trays mounted in said shell and formed with peripheral notches and removable plugs normally seated in and closing said notches.

6. A liquid and vapor separating tower comprising an upper set of bubble trays, a vapor outlet above said trays, and a lower distilling section consisting of a plurality of superposed shallow pans adapted to contain liquid therein, uprising peripheral flanges on some of said pans, uprising central flanges on others of said pans, said pans being arranged to provide a zig-zag flow path for down-flowing liquid and a continuous open flow path for uprising vapors.

7. An oil and vapor separating tower comprising an upper set of bubble trays, a vapor outlet above said trays and a lower distilling section consisting of a plurality of superposed shallow pans adapted to contain liquor therein, uprising peripheral flanges on some of said pans, uprising central flanges on others of said pans, all of said pans being arranged to provide a zig-zag flow path for downflowing liquid and a continuous flow path for uprising vapors, means for spraying relatively cool raw oil onto said pans, and means for supplying heated oil vapors to the tower below said distilling section.

8. A fractionating tower comprising a chamber having an upper vapor outlet, a lower liquid outlet, a lower hot vapor inlet, a bubbling still section, and a distilling section, said distilling section comprising a plurality of liquid holding pans, each of said pans having an uprising flanged portion over which liquid contained thereon flows, said flanged portions on adjacent pans being substantially spaced apart radially providing a radially undulating path of flow for downflowing liquid, and means for passing raw oil to be distilled into said distilling section.

9. A fractionating tower comprising a chamber having an upper vapor outlet, a lower liquid outlet, a lower hot vapor inlet, a bubbling still section, and a distilling section, said distilling section comprising a plurality of liquid holding pans, each of said pans having an uprising flanged portion over which liquid contained thereon flows, said flanged portions on adjacent pans being substantially spaced apart radially providing a radially undulating path of flow for downflowing liquid, means for spraying raw oil to be distilled into said distilling section, and means for supplying reflux liquid to the top of the bubbling still section.

10. A fractionating tower comprising a chamber having an upper vapor outlet, a lower liquid outlet, a lower hot vapor inlet, a bubbling still section, and a distilling section comprising a plurality of vertically spaced liquid holding pans, each of said pans having an uprising flanged portion over which liquid contained thereon flows, said flanged portions on adjacent pans being substantially spaced apart radially providing a radially undulating path of flow for downflowing liquid, and means for separately passing raw oil to be distilled onto a plurality of said pans.

11. In a bubbling still, a bank of super- imposed trays each having vapor passages opening through it, and tubular portions surrounding said passages and projecting upward above the body of the tray, bells capping said tubular passages, and a perforated diaphragm above each tray engaging the upper ends of the bells to hold the latter in place.

12. In a bubbling still, a bank of super-imposed trays each having vapor passages opening through it, and tubular portions surrounding said passages and projecting upward above the body of the tray, bells capping said tubular passages, and a perforated diaphragm above each tray engaging the upper ends of the bells to hold the latter in place and having its marginal edge in engagement with the marginal portions of the tray bank.

13. In a bubbling still, the combination with a bank of super-imposed trays each formed with uprising and depending marginal portions, and each having a plurality of vapor passages opening through it and tubular portions surrounding said passages and projecting upward above the body of the tray, bells capping said tubular passages, and a perforated diaphragm above each tray, and engaging the upper ends of the corresponding bells to hold the latter in place, and having its marginal edge received between said marginal portions of the trays above and below the diaphragm.

14. In a bubbling still, the combination with a bank of super-imposed trays each formed with a series of vapor passages opening through it and tubular portions surrounding said passages and projecting upward above the body of the tray and bosses on the upper side of each tray projecting upward a lesser distance than said tubular portions, bells capping said tubular portions and projecting upward from the tray body, a pair of perforated diaphragms above each tray, one resting on the bosses thereof, and the other engaging the tops of the corresponding bells, drain pipes passing through each tray and located one centrally with respect to each of the said bosses thereof, and having its lower end extending into the space immediately above the subjacent tray and between the latter and the immediately adjacent perforated diaphragm.

15. The combination with a bank of super-imposed bubbling still trays and co-operating means providing liquid sealed passages for upflowing vapor and for downflowing liquid, of perforated liquid and vapor distributing trays in the vapor spaces between the first mentioned trays.

16. A liquid and vapor separating tower comprising a plurality of vertically spaced liquid holding distilling trays, alternate distilling trays being arranged with fluid passages radially spaced from fluid passages in the next subjacent trays and providing a radially undulating path of flow, and a multiplicity of depending radially extending projections at the under side of each of said trays arranged in a plurality of circular series radially spaced from the vertical axis of said trays and in said path of flow, whereby the heat transfer capacity of the apparatus is substantially increased.

Signed at New York city, in the county of New York, and State of New York, this 30th day of January, A. D. 1925.

JOHN PRIMROSE.